US010198080B1

(12) United States Patent
Worley, III et al.

(10) Patent No.: US 10,198,080 B1
(45) Date of Patent: Feb. 5, 2019

(54) VIRTUAL USER INTERFACE

(71) Applicant: RAWLES LLC, Wilmington, DE (US)

(72) Inventors: William Spencer Worley, III, Half Moon Bay, CA (US); Louis Leroi Legrand, III, Seattle, WA (US); Christopher David Coley, Morgan Hill, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 750 days.

(21) Appl. No.: 13/794,626

(22) Filed: Mar. 11, 2013

(51) Int. Cl.
*G06F 3/01* (2006.01)
*G02B 27/00* (2006.01)

(52) U.S. Cl.
CPC ......... *G06F 3/017* (2013.01); *G02B 27/0093* (2013.01)

(58) Field of Classification Search
CPC ........ G09F 19/18; A63F 13/06; G06F 3/0346; G09G 3/3225; G09G 2330/025; G09G 2330/06; H04N 9/3173; H04N 9/3194; H04N 9/3147; G03B 21/00
See application file for complete search history.

(56) References Cited

U.S. PATENT DOCUMENTS

| 8,523,673 | B1* | 9/2013 | Boyd et al. ................. 463/34 |
| 8,971,629 | B2* | 3/2015 | Mekenkamp et al. ........ 382/181 |
| 9,053,456 | B2* | 6/2015 | Verthein et al. |
| 2004/0165060 | A1* | 8/2004 | McNelley et al. ......... 348/14.08 |
| 2007/0126864 | A1* | 6/2007 | Bhat ..................... H04N 5/144 348/51 |
| 2009/0173654 | A1 | 7/2009 | Steenblik et al. |
| 2009/0189971 | A1* | 7/2009 | Yoder ................... G06Q 10/06 348/14.01 |
| 2011/0321143 | A1* | 12/2011 | Angaluri ............. H04N 9/3194 726/6 |

* cited by examiner

*Primary Examiner* — Abbas Abdulselam
(74) *Attorney, Agent, or Firm* — Lindauer Law, PLLC

(57) ABSTRACT

A virtual user interface is provided which may be used in conjunction with furniture such as shelves, tables, carts, and so forth. The furniture itself may have no active input/output mechanisms such as processors or onboard sensors. Visual output for the user interface may be projected from an overhead projector onto a plurality of projection surfaces on the furniture. Input, such as a user gesturing towards or touching the projected location of a control element, may be detected remotely.

21 Claims, 12 Drawing Sheets

VIRTUAL USER INTERFACE

BACKGROUND

Items may be stored, presented, displayed, and so forth using furniture. The items may include products for sale, rent, use in the course of operations, and so forth. As consumers and the items themselves become more sophisticated, users may benefit from a richer interaction which goes beyond simply looking at the item or perhaps picking up the item. However, implementation of these richer interactions has been hampered by traditional furniture's inability to support a robust interactive user interface.

Figure 1:
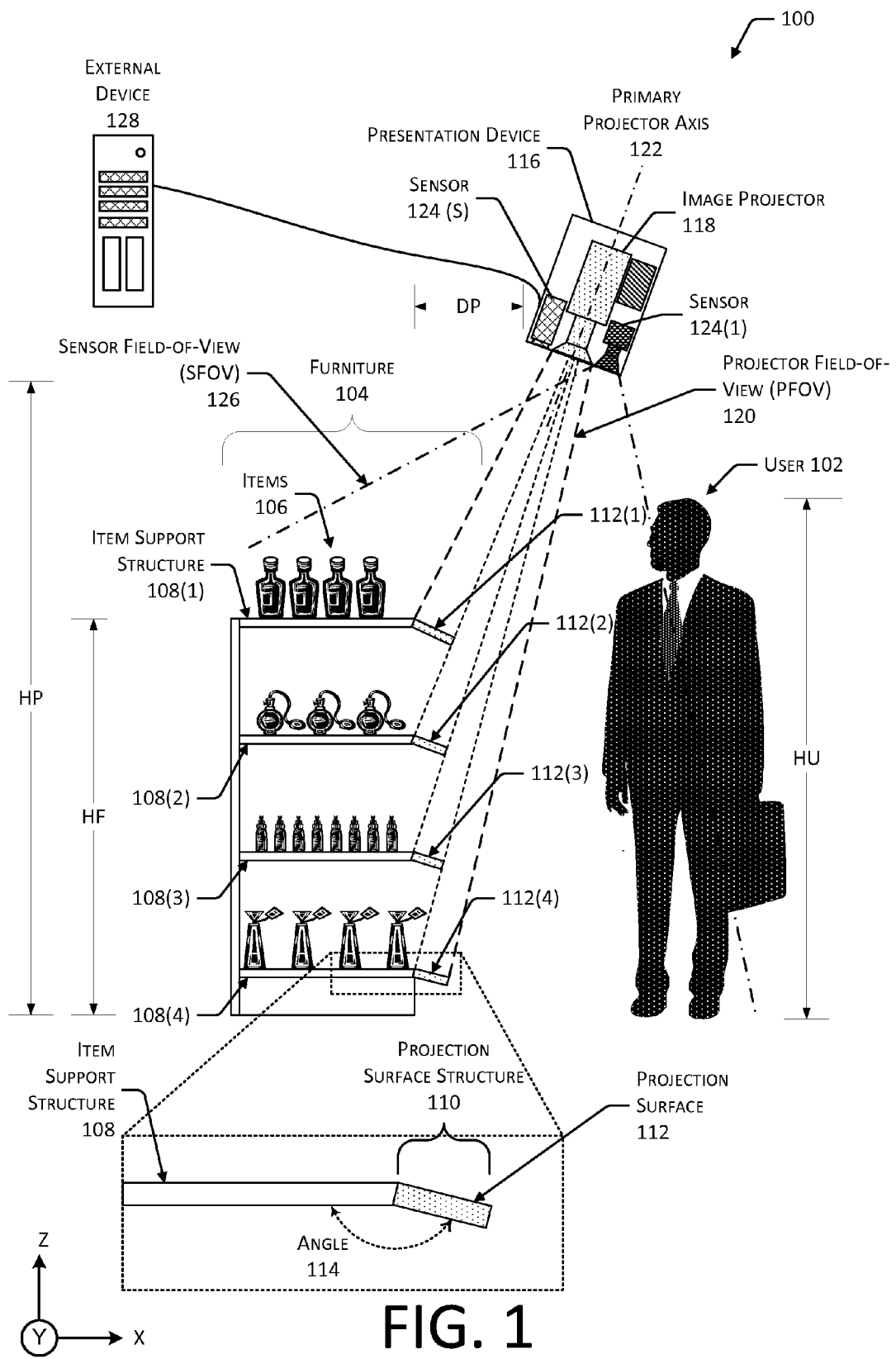
FIG. 1 is an illustrative system configured to provide a virtual user interface using an image projector and a plurality of projection surfaces at different distances from the image projector.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A variety of physical items ranging from food products to spare parts are handled every day in a variety of environments. These environments may include retail shops, wholesale supply houses, warehouses, factories, offices, libraries, medical facilities, and so forth. These items are presented, contained, held, or supported by furniture such as carts, shelving, display stands, racks, tables, cases, and so forth. In some implementations, these items may be involved in a variety of commercial transactions such as sale, lease, rental, and so forth.

The interface between a user, such as a shopper, and the items has traditionally been limited to the item itself, pre-printed tags, or devices such as dedicated computing devices. For example, a shopper may pick up a bottle of cologne from a shelf in a retail store to inspect the item, read the label, and so forth. Or the shopper may look at a preprinted "shelf talker" tag with limited information about the item. These systems are very labor intensive and time consuming to maintain. For example, changes to a tag require human intervention to venture to the shelf and carry out the change.

Previously available dedicated computing devices have used physical buttons, displays, and so forth mounted on or near the shelving. However, these dedicated computing devices have proven expensive to maintain and are limited in functionality. The physical buttons they use are prone to failure and visual output has been limited to simple text or graphics, failing to provide a rich interaction experience for the user.

Described in this disclosure are systems and techniques for providing a virtual user interface to one or more users. The user interface is "virtual" in that the portion of the user interface which the user appears to be interacting with is projected by a device which is at a different location.

To support the virtual user interface, furniture is configured with one or more projection surface structures. Each of the projection surface structures includes a projection surface. A presentation device with one or more image projectors may be arranged above the projection surface structures and configured to project a projected image onto the one or more projection surfaces. A projector field-of-view ("PFOV") of each of the image projectors may encompass a plurality of the projection surfaces.

The projection surfaces may be arranged at different distances relative to the image projector. To provide a focused image at each of the projection surfaces in the PFOV, a tilt shift lens arrangement may be used in the image projector to produce a non-orthogonal image focus plane. Other techniques such as image processing techniques may also be used.

The one or more image projectors provide the projected image which presents a visual portion of the virtual user interface. In one implementation, the virtual user interface may include presentation of projected item tags. The projected item tags may include pricing information, details about products, user ratings of the products, interaction controls such as virtual buttons to purchase immediately, purchase for shipment, change a presented language, and so forth. The virtual user interface may thus present information about the items which is projected onto a projection surface which may be near the items.

The virtual user interface may accept input from one or more sensors. These sensors may be configured to detect one or more of position, motion, or orientation of an object such as a user's finger, hand, or head in a volume which is near the projection surfaces. For example, the sensors may detect and provide as user input the user pointing at an interaction control which is projected onto a projection surface, at an item, and so forth. For ease of discussion in this disclosure, "position" includes information indicative of location, motion, or orientation of an object. This user input may then be used to initiate actions, such as presenting additional information, purchasing the product, changing the language presented, and so forth.

The sensors may include range cameras or other devices configured to determine a position of one or more objects in a volume. These devices may utilize one or more of stereoscopic vision, time-of-flight, structured light, interferometry, coded aperture, or other techniques. The object detected by the sensors may be an active device such as a fob which emits a signal which may be used for identification, positioning, and so forth. Similarly, a passive device such as an object with a machine-readable optical code such as a barcode or pattern may also be provided.

The virtual user interface is rapidly reconfigurable, allowing quick changes to information presented to the user, such as pricing, user ratings. The information may be retrieved from local storage, an external device such as a cloud server, or both. The ability to readily update information allows for greater options with regards to the user interaction. For example, the projected item tag may contain information which is targeted to a particular user such as a language preference, or may provide an interactive experience based on user input.

Furthermore, because of the virtual nature, the virtual user interface is physically robust allowing for use in demanding high-traffic areas such as grocery stores, hardware stores, warehouses, and so forth. While this disclosure discusses user interfaces which are graphical, other user interfaces such as audio, haptic, or olfactory interfaces may be provided.

Illustrative System

FIG. 1 is an illustrative system 100 configured to provide a virtual user interface. A user 102 having a height "HU" is depicted standing in front of a piece of furniture 104. The furniture 104 is holding several items 106. A single user 102 is depicted for ease of illustration, and not as a limitation. For example, multiple users 102 may be in front of the same piece of the furniture 104.

The items 106 comprise one or more physical objects. These physical objects may be goods or physical tokens associated with services or information which are for sale, rental, distribution, and so forth. For example, the items 106 may comprise products for sale in a retail environment, boxes with printed activation codes inside for download of a particular piece of music, medical supplies in a hospital environment, and so forth.

The furniture 104 comprises a plurality of item support structures 108. The overall height of the furniture 104 may be described as a height above the floor, indicated here as "HF". While the height HF is depicted as being less than HU, in other implementations and with other users 102, the HF may be greater than or equal to the HU.

In some implementations the furniture 104 may comprise one or more fixtures. These fixtures may bolted, screwed, glued, or otherwise affixed to structures in the environment such as the floor, walls, ceiling, and so forth. For example, the furniture 104 may comprise a vertical display rack which is suspended from an overhead support.

In the implementation depicted here, the item support structures 108 are shelves. In other implementations, the item support structures 108 may comprise bins, baskets, drawers, racks, pegs, rods, pigeonholes, and so forth. The item support structures 108 support or hold the items 106 at a particular location. The item support structures 108 may be fixed within the furniture 104, or may be adjustable. For example, the furniture 104 may include shelving with adjustable height and so forth. A single piece of the furniture 104 may incorporate different item support structures 108. For example, the furniture 104 may have shelves as well as pigeonholes and pegs in order to support different items.

Furthermore, the dimensions of the item support structures 108 may vary. For example, one shelf on the furniture 104 may be deeper than another.

The item support structure 108 has an associated projection surface structure 110. The association may be proximate, or a physical coupling. For example, where the item support structure 108 comprises a single shelf, the projection surface structure 110 may be coupled to a front edge of the shelf, the front being proximate to the user 102 during normal use. In another example, where the item support structure 110 includes pegs, a single projection surface structure 110 may be adjacent to several pegs. In some implementations the projection surface structure 110 may comprise a portion of the item support structure 108. For example, the material of the shelf may be extended to provide the projection surface structure 110.

The projection surface structure 110 is configured to support a projection surface 112. The projection surface 112 is configured to receive incident light from a projected image and present that projected image to the user 102. The projection surface 112 may have an overall shape which is planar, curvilinear, faceted, and so forth. The projection surface 112 may comprise one or more structures or materials configured to accept light along the primary projector axis 122 and direct the accepted light at an angle other than back to the source, such as towards the user 102. The projection surface 112 may also be configured to reject or redirect light from angles other than the primary projector axis 122.

The projection surface 112 may be a coating such as paint applied to the projection surface structure 110. In another implementation, the projection surface 112 may comprise a separate unit such as sheet comprising a variety of light-directing structures. In yet another implementation, the item support structure 108, the projection surface structure 110, and the projection surface 112 may comprise a unitary structure.

The projection surface 112 may be arranged to provide an angle 114 relative to a plane, axis, or tangent of the item support structure 108. As depicted here, the projection surface structures 110 and the corresponding projection surfaces 112 may be arranged at an angle 114 in which the projection surface structure 110 is slanted downward, away from a plane of the item support structure 108. The angle 114 may vary between the different item support structures 108, based at least in part on a position relative to a presentation device 116.

The presentation device 116 is configured to support the operation of the virtual user interface. The presentation device 116 may be arranged at a height above the floor designated as "HP". The distance HP may be greater than the distance HF, placing the presentation device 116, or a portion thereof, above the furniture 104. As depicted, the HP may be greater than the HU, placing the presentation device 116 above the user 102 as well. A horizontal distance between the item support structure 108 and the presentation device 116 is depicted as "DP". This distance may be non-zero, placing the presentation device 116 in a position which is above, but not necessarily directly above, the projection surface structure 110.

The presentation device 116 may include one or more different devices located in different chassis, which are in communication with one another. The presentation device 116 may include one or more image projectors 118.

The image projector 118 is configured to emit light which will form an image on a distant object. This image may be used to provide a graphical output for the virtual user interface. The user 102 may look at the one or more projection surfaces 112, and see at least a portion of the projected image. The image projector 118 may comprise one or more lamps, liquid crystal displays, digital micromirror devices, microelectromechanical ("MEM") spatial light modulators, liquid crystal on silicon, light emitting diodes, lasers, and so forth. The image projector 118 may be configured to present images in raster or vector fashion. The image projector 118 may be configured to generate monochrome or color projected images.

The image projector 118 generates an image having the PFOV 120. In some implementations, this PFOV 120 may be generally rectangular or square. In some implementations, two or more image projectors 118 separated from one another may be configured to have overlapping or coincident PFOVs 120. This may be used to reduce the impact of the user 102 or other objects occluding the projected image and generating a shadow on the projection surface 112. In some implementations, the image projector 118 may be configured to provide a projected image with a resolution at the projection surfaces 112 of at 72 pixels per inch.

Because of the position of the presentation device 116 relative to the plurality of projection surfaces 112, a tilt shift lens arrangement may be used to provide a focused projected image at the projection surfaces which are at different distances from the image projector 118. The tilt shift lens arrangement is configured to optically implement the Scheimpflug principle, allowing a plane of focus for the projector to be non-perpendicular to a primary projector axis 122. In some implementations, the shift functionality may be omitted, providing just the tilt. The tilt shift lens arrangement may include one or more optical elements which are displaced relative to one another. These optical elements may include lenses, mirrors, prisms, diffraction gratings, image generation elements, and so forth. In some implementations the tilt shift lens arrangement may be fixed or variable to allow for changes in relative position between the image projector 118 and the plurality of the projection surfaces 112.

The primary projector axis 122 may be designated as a line orthogonal to a real or virtual plane at which a projected image is formed within the image projector 118 mechanism immediately before exiting the image projector 118. Instead of, or in addition to the tilt shift lens arrangement, image processing techniques may also be used to produce the projected image. These techniques may include projection defocus, distortion correction, and so forth.

The presentation device 116 may also include, or be coupled to, one or more sensors 124(1), 124(2), . . . , 124(S). These sensors 124 are configured to detect one or more of position, motion such as translation or rotation, or orientation of an object in a volume which is near the projection surfaces 112. The objects may include at least a portion of the user 102, the items 106, and so forth. The objects may also include active devices such as fobs emitting signals detectable by the sensors 124 or passive devices configured to be scanned by the sensors 124. In some implementations the sensors 124 may be configured to resolve a volume which is 3 millimeters cubed or smaller. For example, the sensors 124 may detect and provide as user input the tip of the user's 102 finger pointing at an interaction control which is projected onto the projection surface 112, at an item 106, and so forth.

The sensors 124 may include range cameras or other devices configured to determine a position of one or more objects in a volume. The determined position and other information such as motion, orientation, and so forth may be used as input to the virtual user interface. For example, the particular translation and rotation of the user's 102 hand may be received and interpreted as input.

The sensors 124 may include devices which utilize one or more of stereoscopic vision, time-of-flight, structured light, interferometry, coded aperture, or other techniques. The determined position may be absolute in space, or relative. Absolute position may indicate that the object is at a particular coordinate relative to an absolute unit of measure. For example, the user's first fingertip is at (X,Y,Z) coordinates (+29.31, +17.11, +28.71) expressed in inches relative to an origin, while the user's second fingertip is at coordinates (+28.11, +18.22, +29.05) relative to the origin. In comparison, relative position may indicate that the second fingertip is above and to the right of the first fingertip. The sensors 124 may have a sensor field-of-view ("SFOV") 126 which is greater than that of the PFOV 120, less than, or the same as. For example, while the image projector 118 may throw an image onto the PFOV 120 bounded by the projection surfaces 112, the sensors 124 may generate position data for objects which are also in front of the projection surfaces 112 and outside of the PFOV 120. In some implementations a plurality of SFOVs 126 may overlap one another. This overlap may mitigate occlusion by the user 102 or other objects in the environment, improve input detection, and so forth. The sensors 124 may also acquire other information such as weight, pressure, size, data from active or passive devices, and so forth. The sensors 124 are described below in more detail with regard to FIG. 7.

The presentation device 116 may be communicatively coupled to an external device 128. The presentation device 116 may include one or more communication interfaces configured to couple to one or more data networks. These data networks may include personal area networks, local area networks, wide area networks, and so forth. The external device 128 may include, but is not limited to, one or more servers. In some implementations a plurality of servers may be configured to offer services to many different presentation devices 116 at many different locations, acting as a cloud server.

Figure 2:
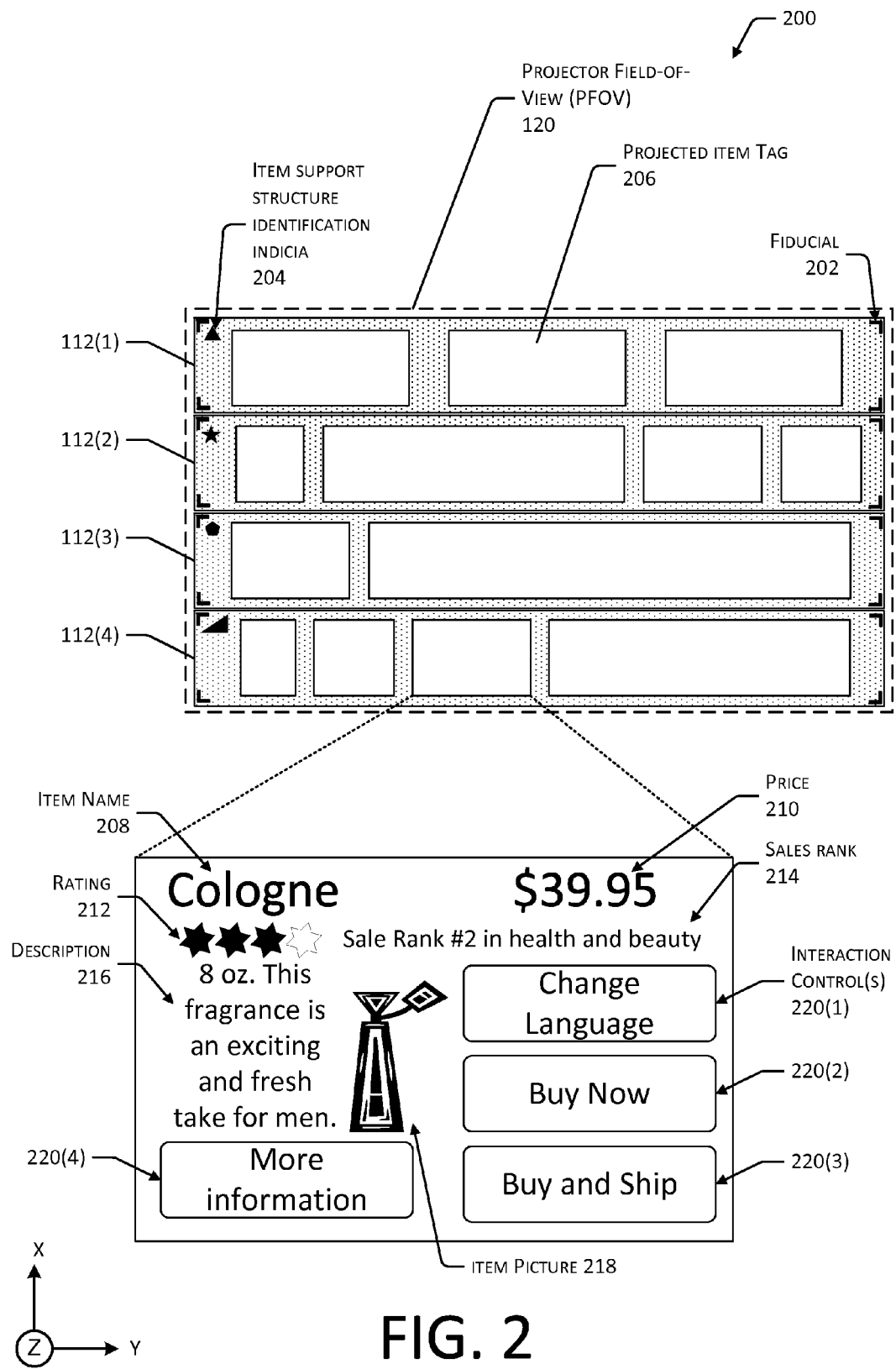
FIG. 2 illustrates a plurality of projection surfaces with fiducials in a single image projector field-of-view, as well as an example projected item tag.

FIG. 2 illustrates a plurality 200 of the projection surfaces 112 from a perspective of the user 102. Displayed here with a dashed line is the PFOV 120 of the image projector 118. The PFOV 120 encompasses the plurality of projection surfaces 112. As a result, a single frame of a particular projected image is thus presented across different projection surfaces 112. These projection surfaces 112 may be discontinuous from one another, each at a different position relative to the image projector 118. For example, an uppermost projection surface 112(1) is closer to the image projector 118 than a bottommost projection surface 112(4).

One or more fiducials 202 may be arranged on the projection surfaces 112, or associated with the projection surfaces 112. In some implementations, the one or more fiducials may be arranged on or associated with the item support structure 108, the projection surface structure 110, and so forth. The fiducials 202 may also be known as "fiducial markers." The fiducials 202 may act as reference artifacts, positioning indicators, and so forth and are configured to be machine readable, human readable, or both. The fiducials 202 may be two- or three-dimensional. For example, as illustrated here, right-angle brackets printed in the corner of each of the projection surfaces 112 may act as fiducials 202 to provide for alignment and calibration of the projected image from the one or more image projectors 118 onto a particular projection surface 112. In another example, the fiducial 202 may include a three-dimensional object, such as a knob or projection. The shape, dimensions, or both shape and dimensions of the three-dimensional fiducial may be known. In some implementations, the projection surface 112 may act as an implicit fiducial 202. For example, the projection surface 112 may have a known size and shape.

In one implementation the fiducials 202 may be detected by the one or more sensors 124, and this data may be used to provide to configure image correction in the projected image from the image projector 118, or in images acquired by the one or more sensors 124. Calibration of the image projector 118 based on data from the sensors 124 is discussed in more detail below with regard to FIGS. 7 and 10. This calibration may be initial, periodic, ongoing, or on demand.

The one or more fiducials 202 may also be used to calibrate the sensors 124. For example, the one or more fiducials 202 may be used a stadiametric calibration of a range camera by providing an artifact of known size and shape. By processing an image of the fiducial and based on previously stored information about the optical system of the sensor 124, a distance and relative position may be determined. In addition to their shape and size, the one or more fiducials 202 may provide or act as other references targets, such as for color or shading. The fiducials 202 may be printed on, embossed into, adhered to, or otherwise associated with the one or more projection surfaces 112.

Other information may also be provided on the projection surfaces 112. In some implementations an item support structure identification indicia 204 may be provided. The item support structure identification indicia 204 are configured to identify a particular item support structure 108 on the furniture 104. The scope of the uniqueness of the indicia may vary. For example, the scope of the indicia 204 may be local to a particular piece of the furniture 104, such as specifying a particular shelf as being the uppermost. In another example, the scope may be enterprise-wide, such as a particular shelf in a large retail store. In yet another example, the scope may be global, such as a unique number, such as shelf number 139940194.

As with the fiducials 202, the indicia 204 may be printed on, embossed into, adhered to, or otherwise associated with the one or more projection surfaces 112. As described above, the indicia 204 may be machine readable, human readable, or both.

The fiducials 202 and the item support structure indication indicia 204 may be configured to be usable under illumination from one or more wavelengths, such as infrared, visible light, ultraviolet, and so forth. In other implementations, the fiducials 202, the indicia 204, or both may be non-optical systems, such as radio frequency identification ("RFID") tags, near field communication ("NFC") tags, and so forth.

Within the PFOV 120 of the image projector 118, a projected image may be presented. The image projector 118 may use the tilt shift lens arrangement described above to provide a plane of focus for the PFOV 120 which is non-orthogonal to the primary projector axis 122. As also described above, the projection surface structures 110, and the corresponding projection surfaces 112 may be arranged at the angles 114. These angles 114 may be determined based at least in part on the position of the presentation device 116. In some implementations, the angles 114 may also be based at least in part on an expected position of the user 102 during use.

As described above, the projected image may present at least a portion of the graphics associated with the virtual user interface. The projected image may include one or more projected item tags 206, or other information or graphical user interface ("GUI") elements, pictures, videos, and so forth. Because of their virtual nature, the projected item tags 206 or other visual part of the virtual user interface may be presented anywhere within the PFOV 120, allowing for great flexibility in operation. For example, as shelf space used for a particular item 106 grows or shrinks with waxing or waning demand, the projected item tag 206 may be adjusted to match. In another example, a variable or scrolling display of different items 106 which are individually very small may be presented in a given area. For example, ten different kinds of toothbrushes may be compactly presented by hanging from peg-type item support structures 108, but with a single large projected item tag 206 which scrolls through information about different toothbrushes in that section.

The projected item tags 206 or other elements may be presented within one or more projection locations. The projection locations may be configured to avoid edges of the projection surfaces 112, fiducials 202, item support structure identification indicia 204, and so forth. For example, the projection location may be an area on the projection surface 112 which extends to within one-half inch of the edges of the projection surfaces 112. In another example, where the fiducials 202 are visible to the unaided human eye, the projection location may be configured such that projected item tags 206 or other portions of the virtual user interface are not presented atop the fiducials 202.

In this illustration, an enlarged view of a projected item tag 206 image is shown. In this illustration a variety of GUI elements are presented. In other implementations or situations, other portions of a GUI may be presented.

The information upon which the elements are based may be retrieved from storage internal to the presentation device 116, or from the external device 128, or both. As described above, the external device 128 may include a cloud server accessible using a wide area network such as the Internet.

In some implementations, the information may be based at least in part on recognition of the one or more items 106. For example, in a new store employees may have placed items 106 on the shelf. The sensors 124 may acquire information such as radio frequency identification ("RFID") tag information, Universal Product Code ("UPC") images, item shapes and images, and so forth. This information may be provided to an external device 128 such as a cloud server which is configured to process the information and recognize the items 106. Continuing the example, the external device 128 may recognize that UPC 079567100102 corresponds to a particular make of cologne. Information about that cologne may then be retrieved, such as pricing matrices, promotional deals, advertising copy, label information, and so forth. At least a portion of this retrieved information may then be presented as the virtual user interface using the one or more image projectors 118 onto the projection surface 112 associated with the bottle sitting on the shelf.

In this illustration, the projected item tag 206 includes an item name 208, a price 210, and a rating 212. The rating 212 may include customer-entered ratings, made either using the virtual user interface in the store, or from an online storefront or interface. Sales rank 214 may also be presented. The sales rank 214 may indicate sales rank in that particular store in which the user 102 is standing, for a particular time period, overall sales rank across all sales channels, and so forth. Description 216 of the item 106 may also be presented, item pictures 218, and so forth may also be shown.

Interaction controls 220 may also be presented. These interaction controls 220 allow the user 102 a graphical point to interact with to provide user input. For example, the interaction controls 220 may include images of buttons, combo boxes, check boxes, and so forth. The user 102 touches the interaction control 220 with a finger, or point at the interaction control 220 to activate the interaction control 220. The sensors 124 are configured to determine this gesture as an input, and based on the position of the user's 102 finger, activate a particular interaction control 220 associated with that position. In this illustration, interaction controls 220(1)-(4) are presented as buttons to initiate functions such as changing a language used to display information in the projected item tag 206, buying the featured item 106 now, buying and shipping the featured item 106, or requesting more information.

The interaction controls 220 may be embedded or associated with other elements. For example, the user 102 may reach out to touch the projected image of the sales rank 214 to toggle between local sales rank, overall sales rank, and so forth.

As described above, in addition to the projected item tag 206, other information may be presented to the user 102. In one implementation, shelf setup information may be presented to store employee users 102. For example, visual prompts may indicate how many linear inches of shelf space are allocated to a particular item 106, include a picture of the items 106 to be placed at that shelf, and provide information on how to arrange the items 106 on the shelf. Furthermore, the one or more sensors 124 may be used to confirm that the items 106 are properly placed. For example, the sensors 124 may be used to determine the actual number of linear inches and notify a store manager or vendor when a variance from a desired value occurs.

In some implementations, the information may be based at least in part on recognition of the particular user 102. The identity of a particular user may be determined, such as with voice recognition, facial recognition, presence of an active fob, passphrase, and so forth. Particular information designated as being of interest to that identified user 102 may then be presented in the virtual user interface. For example, the user 102 may have a preference to see quantities expressed in English units such as ounces, rather than metric units such as milliliters.

Other information may also be projected on the one or more projection surfaces 112. For example, during an emergency, the projected item tags 206 may be discontinued and emergency instructions such as directional arrows pointing to emergency exits may be presented instead.

Figure 3:
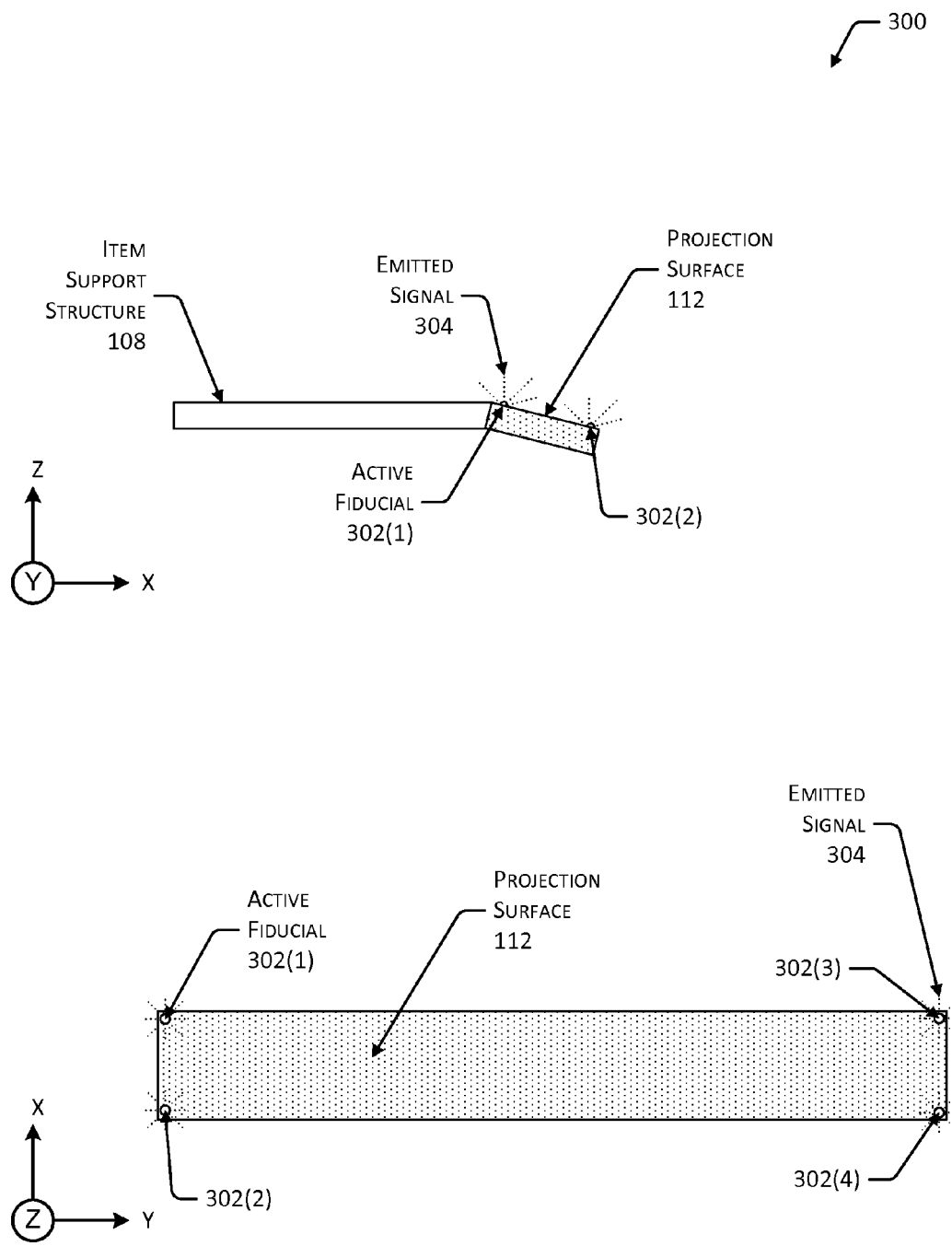
FIG. 3 illustrates active fiducials used to calibrate the image projector, one or more sensors, or both.

FIG. 3 illustrates another implementation 300 of the projection surfaces 112 and the associated fiducials. As described above, fiducials 202 may be used to calibrate the image projector 118, the one or more sensors 124, or both. The fiducials 202 described above in FIG. 2 are passive in that they do not actively emit a signal. In comparison, FIG. 3 depicts active fiducials 302. The active fiducials 302 are configured to provide an emitted signal 304 which is detected by one or more of the sensors 124. The emitted signal 304 may be electromagnetic, such as visible light, infrared light, radio waves, magnetic fields, acoustic, and so forth.

In this illustration, an enlarged portion of the item support structure 108 is shown along with the associated projection surface 112. As shown here, several active fiducials 302(1)-(4) are arranged, one at each corner of the rectangular projection surface 112. In other implementations other quantities and arrangements of the active fiducials 302 may be used. The active fiducials 302 may include light emitting diodes ("LEDs"), RFID tags, NFC tags, ultrasonic emitters, and so forth. The active fiducials 302 may be configured to operate continuously, intermittently, or upon interrogation. For example, where the active fiducials 302 are RFID tags, they may generate the emitted signal 304 after receiving an interrogation signal from an RFID reader device.

The active fiducials 302 or other devices associated with the furniture 104 may be powered by an external power source such as line power, internal batteries, photovoltaic cells, inductive power receivers, and so forth. For example, the image projector 118 may be configured to provide power by illuminating photovoltaic cells which are electrically coupled to the active fiducial 302.

Figure 4:
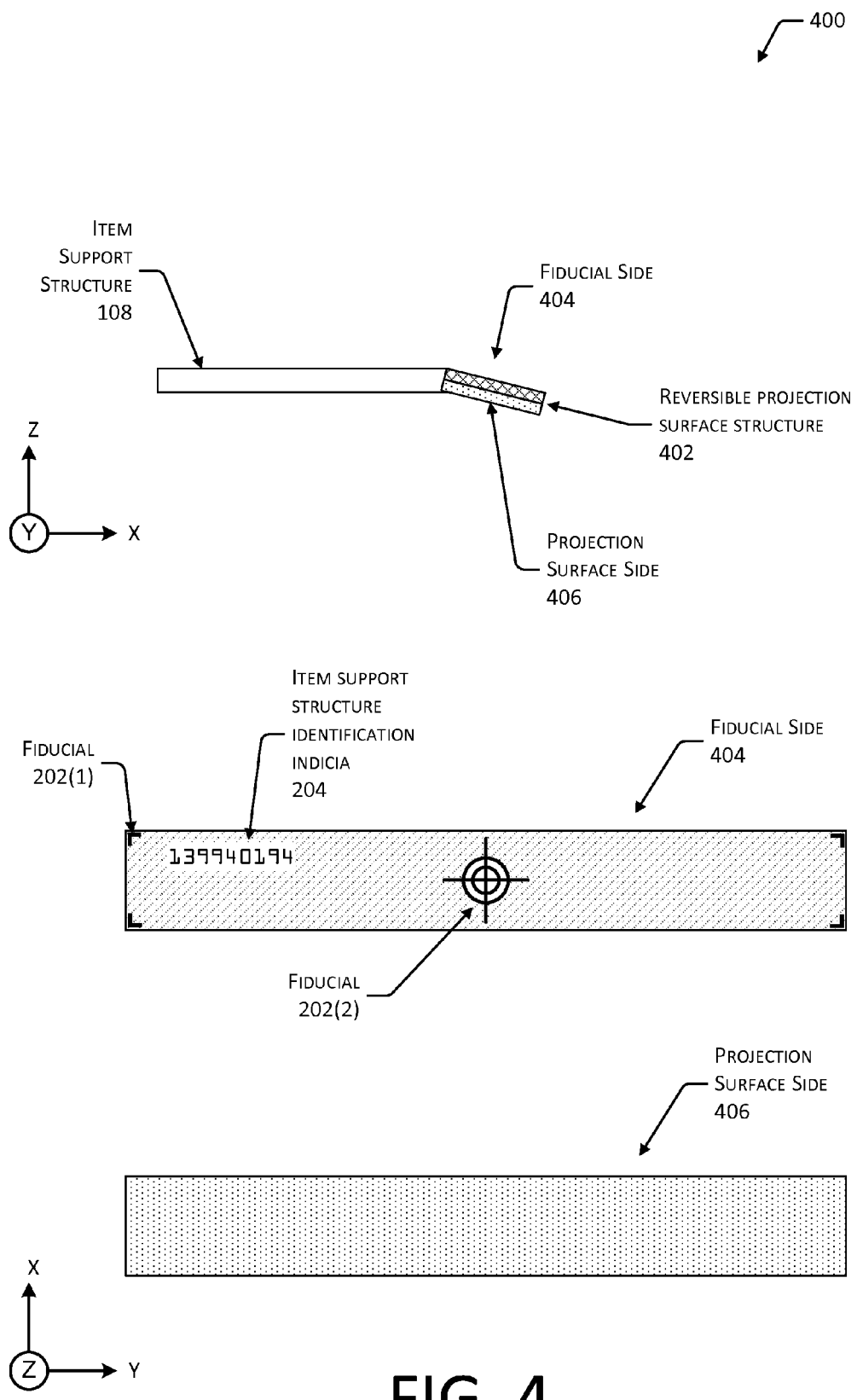
FIG. 4 illustrates a reversible projection surface structure with fiducials on a first side and projection surface side free of fiducials on a second, opposite, side.

FIG. 4 illustrates another implementation 400 of the projection surface 112. As described above with respect to FIG. 2, the fiducials 202 or the active fiducials 302 may be used to calibrate the various portions of the system presentation device 116. In some implementations, it may be desirable to conceal or remove the fiducials 202 or 302 once calibration has been completed.

In this illustration, a reversible projection surface structure 402 is depicted. The reversible projection surface structure 402 has at least a first side and a second side. In this illustration the structure 402 is depicted as a planar hexahedron. In other implementations the structure 402 may use other forms, such as a tetrahedron in a triangular prism shape with a cross section describing an equilateral triangle.

The first side comprises a fiducial side 404, while the second side comprises the projection surface side 406. During calibration, the fiducial side 404 is presented generally towards the presentation device 116. When calibration is not in progress, the projection surface side 406 may is presented generally towards the presentation device 116.

In other implementations the projection surface assembly 112 may be removable, and the projection surface 112 may be removed entirely and replaced with a calibration surface which includes the one or more fiducials.

Figure 5:
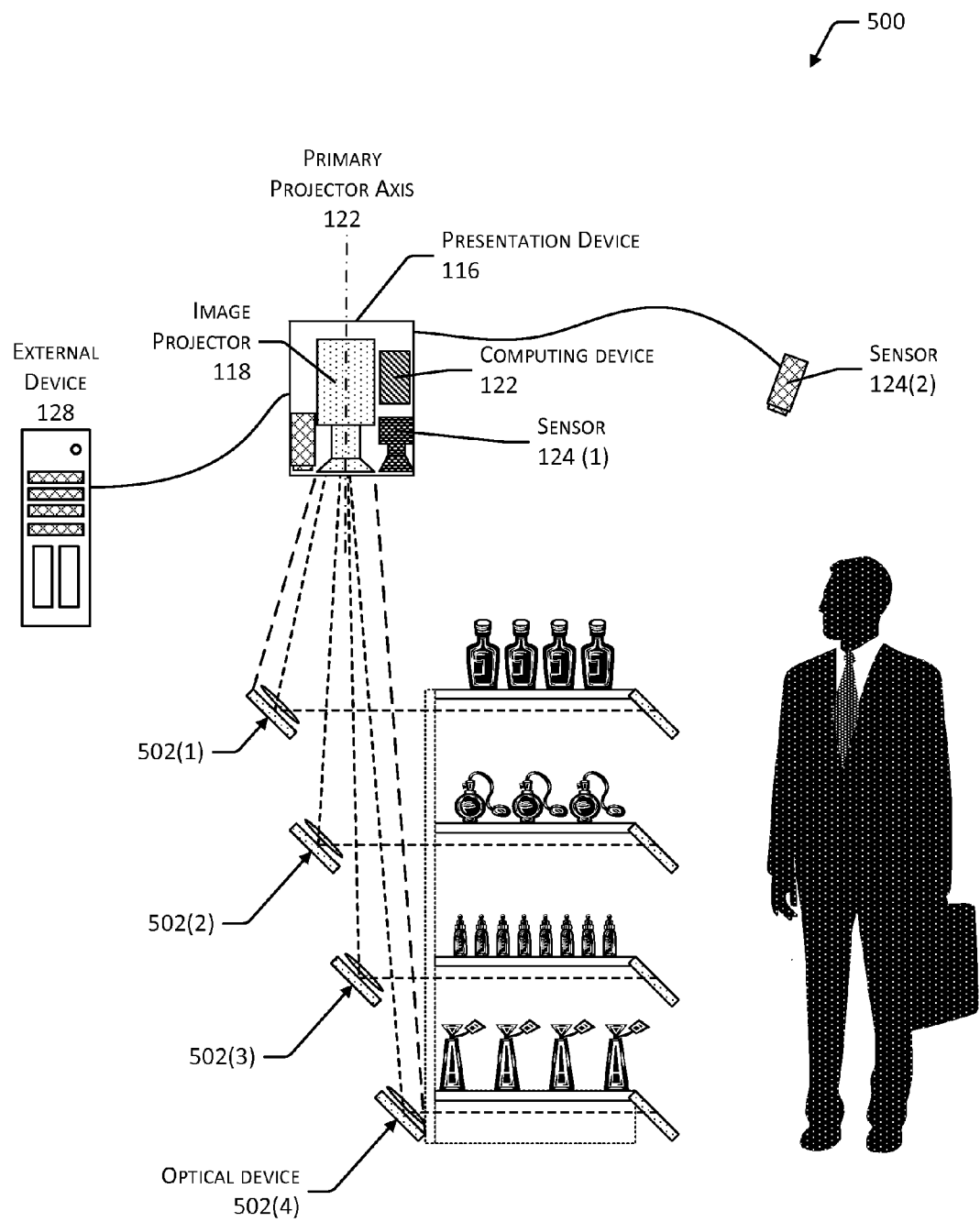
FIG. 5 illustrates an alternative system using rear projection to the projection surfaces.

FIG. 5 illustrates an alternative system 500 for providing the virtual user interface. In this illustration, the presentation device 116 is configured to provide the projected image from the image projector 118 in a rear projection mode, wherein the projected image is incident upon a back surface of the one or more projection surfaces 112.

One or more optical devices 502 may be used to direct the projected image onto the one or more projection surfaces 112. These optical devices 502 may be configured to provide an intermediate image plane. The optical devices may include mirrors, optical waveguides, diffraction gratings, micro- or macro-lenses, and so forth.

As also depicted, one or more of the sensors 124 may be external to a chassis of the presentation device 116. For example, the sensor 124(2) may comprise a range camera which has been mounted such that the SFOV 126 covers the projection surfaces 112 and a volume in front of the projection surfaces 112.

Figure 6:
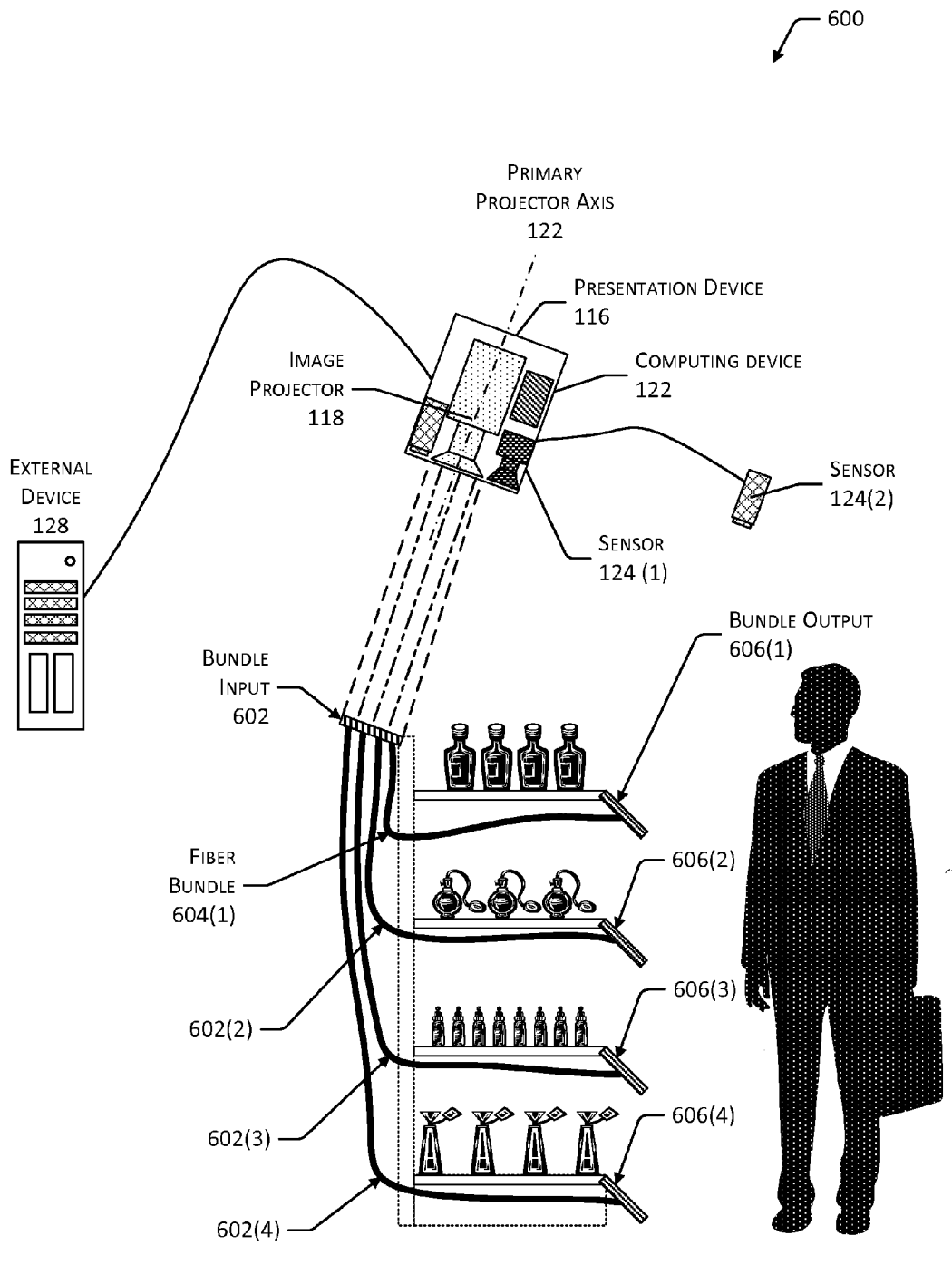
FIG. 6 illustrates an alternative system using optical fiber bundles to present projected images.

FIG. 6 illustrates an alternative system 600 using fiber bundles to present projected images of the virtual user interface. The presentation device 116 is configured to provide the projected image from the image projector 118 onto a bundle input 602. One or more bundle inputs 602 are configured to couple incident light, such as that from the image projector 118, to a plurality of optical fibers arranged into one or more fiber bundles 604. The fiber bundles 604 are coupled to one or more bundle outputs 606. The bundle outputs 606 are configured to present at least a portion of the projected image which is incident at the bundle input 602.

Orientation between points at the bundle input 602 and points in the bundle output 606 is maintained by the fiber bundle 604. For example, an optical fiber located in the extreme upper left of the bundle input 602 is located at the extreme upper left of the bundle output 606. In some implementations, the orientation between the bundle input 602 and the bundle output 606 may be flipped or inverted. For example, the image projector 118 may provide a projected image which is horizontally flipped (right-to-left) and the orientation of the fiber bundle 604 to the bundle output 606 may be configured to flip the image such that the projected image is presented to the user 102 in a desired orientation (left-to-right).

The size, shape, or size and shape of the bundle input 602 may differ from the bundle output 606. For example, a square area of the bundle input 602 measuring one inch on each side may correspond to an area of the bundle output 606 which is four inches on each side. In another example, the bundle input 602 may be rectangular while the bundle output 606 is square.

The bundle input 602 may be fixed or moveable, relative to the furniture 104 or the floor. For example, the bundle input 602 may be configured to pan and tilt to allow for an image plane of the bundle input 602 to be orthogonal to the primary projector axis 122, such as shown here.

Figure 7:
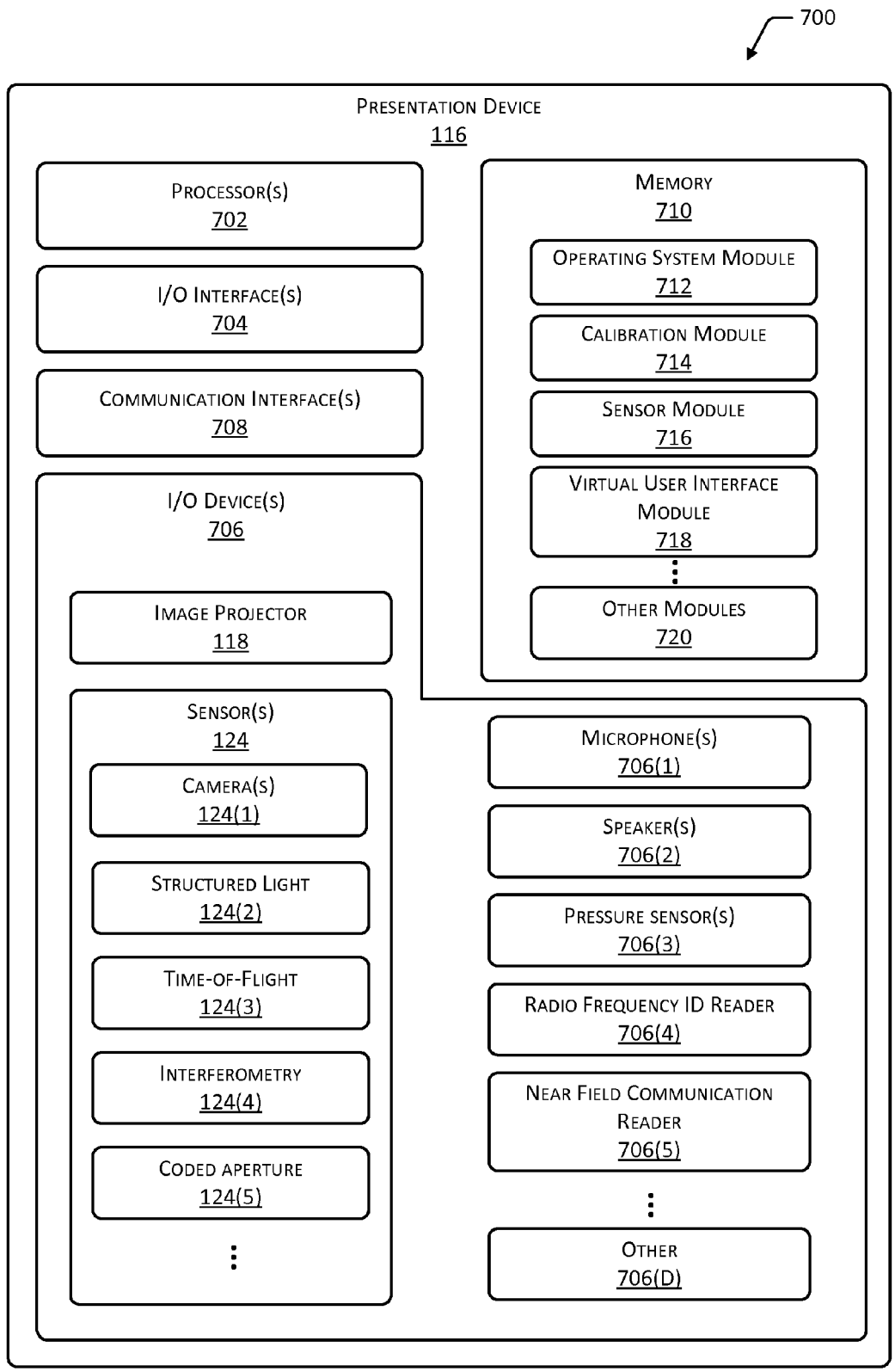
FIG. 7 illustrates a block diagram of a presentation device which supports the virtual user interface.

FIG. 7 illustrates a block diagram 700 of the presentation device 116 which supports the virtual user interface. The presentation device 116 may include one or more processors 702 configured to execute one or more stored instructions. The processors 702 may comprise one or more cores. The presentation device 116 may include one or more input/output ("I/O") interface(s) 704 to allow the processor 702 or other portions of the presentation device 116 to communicate with other devices. The I/O interfaces 704 may comprise inter-integrated circuit ("I2C"), serial peripheral interface bus ("SPI"), Universal Serial Bus ("USB") as promulgated by the USB Implementers Forum, RS-232, Fieldbus, IEC 61158, Process Field Bus ("PROFIBUS"), RS-485, BACnet, and so forth. The presentation device 116 may also include one or more busses or other internal communications hardware or software that allow for the transfer of data between the various modules and components of the presentation device 116.

The I/O interface(s) 704 may couple to one or more I/O devices 706. The I/O devices 706 may include one or more of the image projectors 118, the sensors 124, microphones 706(1), speakers 706(2), pressure sensors 706(3), RFID readers 706(4), NFC reader 706(5), or other devices 706(D) such as ultrasonic transducers or radio frequency receivers.

The one or more sensors 124 may include one or more cameras 124(1). The cameras 124(1) may be configured to generate images from one or more wavelengths, such as infrared light, visible light, ultraviolet light, and so forth. A plurality of cameras 124(1) may be used to provide for stereo vision in order to provide position information about an object in a volume of space.

The one or more sensors 124 may include a structured light system 124(2). The structured light system 124(2) uses a known pattern projected onto objects to determine information such as surface contour, distance, size, and so forth. In some implementations this pattern may be generated by a dedicated projector, or may be provided by the image projector 118. The pattern may be projected in visible light, infrared light, or other wavelengths. With structured light, a camera 124(1) acquires an image which includes at least a portion of the projected pattern. Based at least in part on variations in the pattern due to interactions with the objects, information such as distance, surface contours, size, and other three-dimensional information may be calculated. For example, the structured light system 124(2) may be used to determine where the user's 102 finger is pointing on the projection surface 112.

A time-of-flight ("TOF") system 124(3) uses propagation time to determine a distance to an object in the environment. The TOF 124(3) system may use propagation of signals such as sound, infrared light, visible light, terahertz waves, radio waves, and so forth. For example, in one implementation an optical TOF 124(3) system may direct an infrared laser to scan a volume, emitting pulses of infrared light. During the scan, those pulses reflect at least in part from at least some of the objects in the volume. A detector, such as one of the cameras 124(1) or a photodetector, detects the reflected pulses. A timing mechanism is configured to determine a time-of-flight of the emitted signal. Based on the time-of-flight, a distance to the portion of the object from which the pulse was reflected can be determined. Time-of-flight in the optical domain may be known as LIDAR, in the radio frequency domain as RADAR, and in the audio domain as SONAR. The TOF system 124(3) may be configured to acquire depth information about an entire area within the SFOV 126 for each image frame acquired.

An interferometry system 124(4) is configured to determine three-dimensional information about objects in the SFOV 126 by illuminating one or more points on objects in the SFOV 126 with coherent light. A phase shift, relative to the emitted light, of the reflected light is measured and used to determine a distance to the point on the object.

A coded aperture system 124(5) uses propagation characteristics of light from a scene through a specially coded aperture pattern or grating having holes of various sizes. Given the known coded aperture pattern, information about distance to a point in the image may be determined.

Other sensors 124 may also be present in, or coupled to, the presentation device 116. For example, a transponder interrogation system may be configured to trigger transponder devices located on objects to determine position, orientation, or motion including translation or rotation. The other sensors 124 may include ultrasonic transducers, radio frequency receivers, and so forth.

In some implementations, a combination of the sensor 124 systems may be used to provide the user input. For example, information from the structured light system 124(2) and the interferometry system 124(4) may be combined to determine position information about objects in the SFOV 126.

The I/O devices 706 may also include the one or more microphones 706(1). The microphones 106(1) are configured to receive sounds in the environment. In some implementations a plurality of microphones 706(1) may be configured into one or more arrays. The arrays may be used to provide for beamforming, allowing for directionality in receiving signals from various points in the environment, such as the user's 102 head to acquire speech signals for input. Blind source separation may also be used to separate out the sources of audio signals which are received by the microphones 706(1).

One or more speakers 706(2) may be configured to provide sounds into the environment. The one or more speakers 706(2) may be located on the presentation device 116, in the environment such as on the walls or ceilings, on the furniture 104, and so forth. The sounds provided may include music such as background ambience, audible paging, machine-generated speech, audible prompts, and so forth. A plurality of speakers 706(2) may be arranged in one or more arrays which may be configured to provide beamforming, allowing for directionality in presenting sounds to various points in the environment, such as the user's 102 head. In some implementations the speakers 706(2) may be configured to produce ultrasonic signals which interfere with one another to generate audible sound to the user 102 at a particular location.

The pressure/weight sensors 706(3) may be used on one or more portions of the item support structures 108, the floor, and so forth. For example, pressure sensors may be arranged on a shelf to determine presence of an item 106 due to weight. Pressure sensors may also be arranged on surfaces to provide user input locations, such as physical buttons.

The RFID tag reader 706(4) may be used to determine the presence of items which have been labeled with RFID tags, an RFID tag associated with the user 102, with a particular location in the environment, and so forth. The NFC reader 706(5) is configured to provide for wireless transmission at short distances, such as under eight inches. The items 106, the projection surface structures 110, the projection surfaces 112, and so forth may include NFC tags or readers to determine the proximity of corresponding tags.

Other input devices 706(D) may also be included in, or coupled to, the presentation device 116. For example, a mouse, keyboard, touch screen, and so forth may be provided. In some implementations other independent devices such as smartphones, tablets, notebook computers, and the devices therein may act as input devices 706 which are accessible by the presentation device 116. For example, a personal area network may be used to exchange motion information from accelerometers in a smartphone with the presentation device 116. Based at least in part on this information, the virtual user interface may be modified.

The presentation device 116 may also include one or more communication interfaces 708. The communication interfaces 708 may be configured to provide communications between the presentation device 116 and other devices, such as the external device 128, routers, access points, and so forth. The communication interfaces 708 may include personal area networks ("PANs"), wired and wireless local area networks ("LANs"), wide area networks ("WANs"), and so forth. For example, the interface may include Ethernet, Wi-Fi™®, Bluetooth®, ZigBee®, and so forth.

As shown in FIG. 7, the presentation device 116 includes one or more memories 710. The memory 710 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 710 provides storage of computer readable instructions, data structures, program modules and other data for the operation of the presentation device 116.

The memory 710 may include at least one operating system (OS) module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the modules described next. These modules may be executed as foreground applications, background tasks, daemons, and so forth. In some implementations, at least a portion of these modules may be executed or provided by other devices, such as the external device 128.

A calibration module 714 is configured to calibrate the image projector 118, the one or more sensors 124, or both. Calibration of the image projector 118 may include adjusting the tilt shift mechanism, applying image processing, and so forth to correct for the relative positions between the projection surfaces 112 and the image projector 118. In one implementation the image projector 118 calibration may include generation of projection correction data based on image data acquired by the one or more cameras 124(1). Calibration may be manually initiated, continuous, or may be automatically initiated. A calibration process is described in more detail below with regard to FIG. 10.

A sensor module 716 is configured to processes data from the one or more sensors 124 to determine a position of at least a portion of one or more objects in three-dimensional space in a volume proximate to the plurality of projection surfaces 112. The sensor module 716 may be configured to determine other information, such as motion, orientation, and so forth. In some implementations this may be based on information associated with the active devices or passive devices which may be worn, held, or otherwise manipulated by the user 102. The sensor module 716 may also be configured to determine identity of the users 102.

The sensor module 716 may use sensor fusion techniques to combine data from different sensor systems to generate the information about objects in the SFOV 126. Data from the cameras 124(1), the time-of-flight system 124(3), and coded aperture system 124(5), pressure sensors, information from active devices such as RFID tags, and other sensors 124 may be combined to produce information about the objects. As described above, the information may include position data which is descriptive of an absolute position or a relative position.

A virtual user interface module 718 is configured to maintain the virtual user interface using output devices such as the one or more image projectors 118 and the one or more sensors 124. The virtual user interface module 718 generates images for projection by the image projector 118. For example, the images may include the GUI elements described above with respect to FIG. 2 in the projected item tag 206. The virtual user interface module 718 may provide other output, such as audible, haptic, olfactory, and so forth from respective output devices.

The virtual user interface module 718 processes the position data provided by the sensor module 716, and determines one or more actions based at least in part on the positions, motions, or orientations. These actions may include activating particular interaction controls 220, executing particular instructions, and so forth.

The virtual user interface module 718 may be configured to use the one or more communication interfaces 708 to send or receive information to other devices such as the external device 128. The virtual user interface module 718 may thus retrieve information associated with one or more items 106 supported by the one or more item support structures 108 and then present onto the projection surface 112 associated with the one or more item support structures 108 one or more projected images based at least in part on the retrieved information.

Other modules 720 may also be provided in the memory 710. For example, a speech recognition module may be configured to convert human speech into data suitable for processing by one or more other modules, such as addition input to the virtual user interface module 718.

Figure 8:
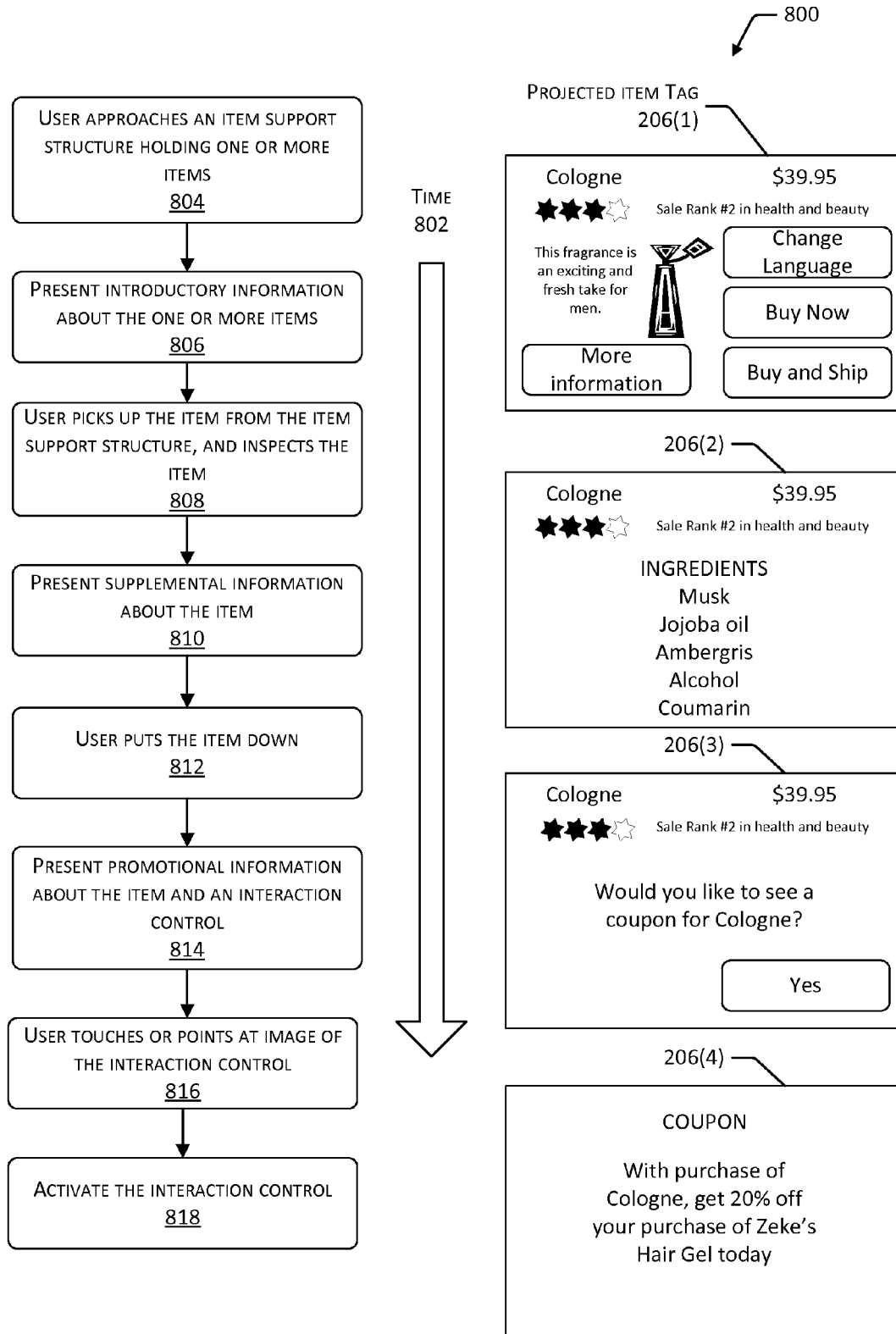
FIG. 8 illustrates a scenario of providing an interactive virtual user interface using the system.

FIG. 8 illustrates a scenario 800 of providing an interactive virtual user interface using the system 100. In this illustration, time moves forward down the page, as indicated by arrow 802. The operations in this scenario may involve the items 106, the item support structure 108, the associated projection surface structures 110 and projection surfaces 112, the presentation device 116, and the external device 128.

At 804, a user 102 approaches the item support structure 108 which is holding one or more items 106. For example, the user 102 may walk up to a shelf upon which bottles of cologne are sitting. At 806, the virtual user interface module 718 presents introductory information about the one or more items 106. The presentation may be an action which is initiated based on data from the sensor module 716 indicating the presence of the user 102 and orientation facing the items 106. As shown here, the introductory information may include the information described above with respect to the illustrative projected item tag 206 described above in FIG. 2.

At 808, the user 102 picks up item 106 from the item support structure 108 and inspects the item 106. The sensors 124 provide information about the change in position of the item 106, as well as the parts of the user 102 such as fingers, orientation of the face, direction of gaze, and so forth. In some implementations, data from the one or more pressure sensors 706(3) may also be used to determine the change in position of the item 106. Based at least in part on this information, at 810 the virtual user interface module 718 presents supplemental information about the item 106. For example, the supplemental information may include information about the ingredients in the cologne which the user 102 has picked up.

Having second thoughts, at 812 the user 102 puts the item 106 down on the shelf. The placement of the item 106 may be determined by the one or more sensors 124, the one or more pressure sensors 706(3), other input devices, or a combination thereof. At 814 the virtual user interface module 718, based at least in part on this information, presents promotional information about the item 106. For example, information about a coupon may be presented. As part of the presented coupon, an interaction control 220 is presented, asking if the user 102 would like to details about the coupon.

At 816 the user 102 touches or points at the image of the interaction control 220. Based on the data from the one or more sensors 124, the sensor module 716 determines the position of the user's 102 finger. Based at least in part on this, at 818 the virtual user interface module 718 initiates the action associated with the interaction control 220. In this example, the action comprises presentation of the coupon.

Using the virtual user interface, the user 102 is presented with a richly interactive experience. Information about items 106 may be readily updated and distributed without the need for employees to manually change shelf talkers or other labels. Furthermore, the information presented may be tailored or customized to a particular user 102. For example, the identity of a particular user may be determined, and particular information designated as being of interest to that user may be shown.

The virtual user interface may also support additional functions such as directing the user 102 to a particular item 106. For example, the user 102 may ask the location for a particular item 106. The virtual user interface may be used to present location information such as "aisle 5, rack 6, shelf 3" for the item 106. In another implementation, the virtual user interface may provide navigational guidance to the location of the requested item 106. For example, arrows or a cursor which traces along the projection surfaces 112 in the environment may be presented for the user 102 to follow.

In some implementations the presentation of the user interface may be dependent upon the presence of a user 102. This may be done to improve longevity of the image projector 118, reduce power consumption, and so forth. In other implementations, the presentation of the user interface in a default state may be continuous. For example, the projected item tags 206 may be presented regardless of whether any users are in the store.

Figure 9:
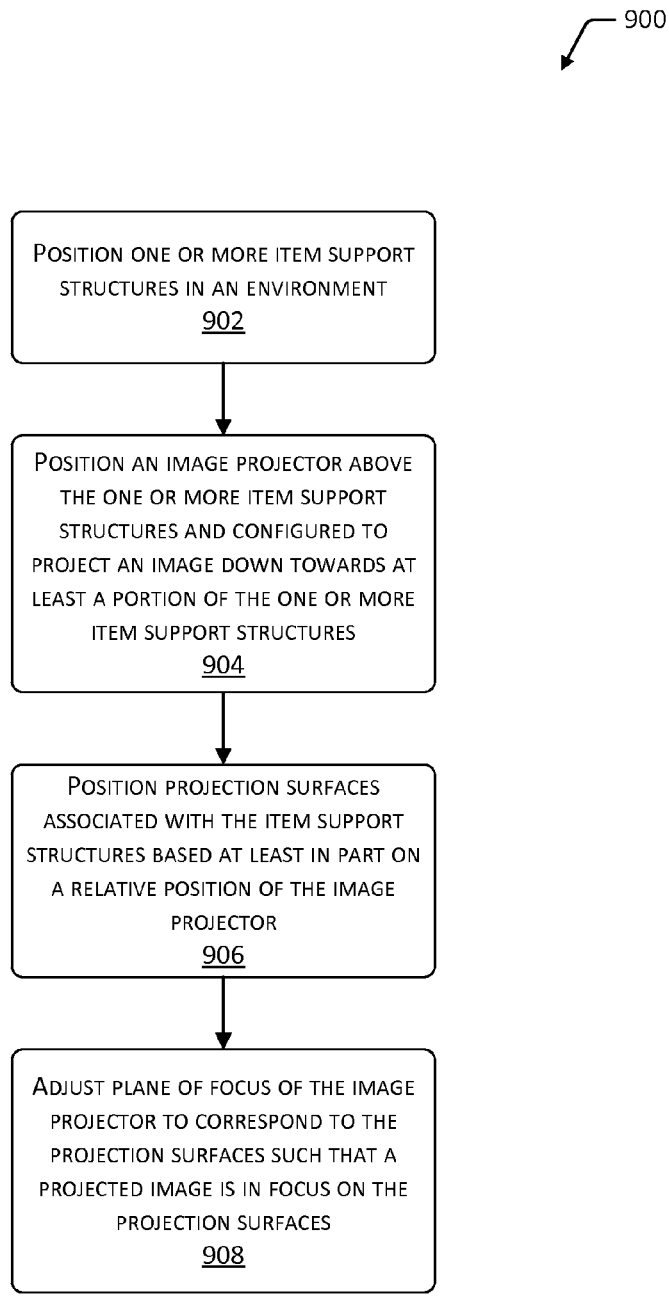
FIG. 9 is a flow diagram of a process of configuring a presentation device to simultaneously project images onto a plurality of projection surfaces at different distances from the image projector.

FIG. 9 is a flow diagram 900 of a process of configuring the presentation device 116 to simultaneously project projected images onto a plurality of projection surfaces 112 at different distances from the image projector 118.

At 902, one or more item support structures 108 are positioned in the environment. At 904, the image projector 118 coupled to or part of the presentation device 116 is positioned above the one or more item support structures 108. The image projector 118 is configured to project an image down towards at least a portion of the one or more item support structures 108.

At 906, projection surfaces 112 associated with the item support structures 108 are positioned. The positioning may include the setting of the angle 114 relative to the item support structure 108. The positioning may be based at least in part on a relative position of the image projector 118. In some implementations the positioning may also be based at least in part on an expected position of the user 102.

At 908, plane of focus of the image projector is adjusted to correspond to the projection surfaces 112 such that the projected image is in focus on the plurality of the projection surfaces 112. As described above, the plane of focus may be adjusted using the tilt shift lens arrangement, one or more image processing techniques, or both.

Figure 10:
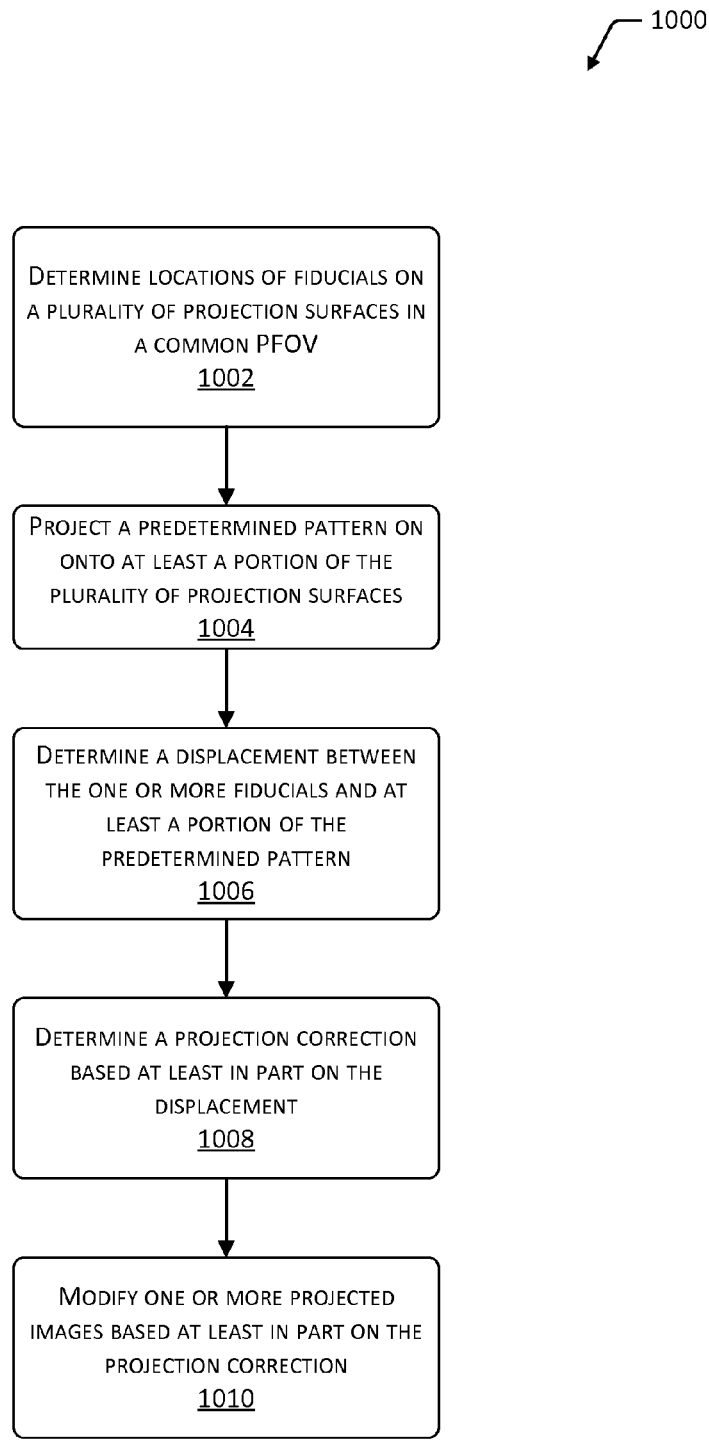
FIG. 10 is a flow diagram of a process of calibrating a projected image based at least in part on one or more fiducials.

FIG. 10 is a flow diagram 1000 of a process of calibrating the projected image based at least in part on one or more fiducials 202 or 302. The process may be implemented at least in part by the calibration module 714.

At 1002, locations of fiducials 202 or 302 are determined on a plurality of projection surfaces 112 in a common PFOV 120. The locations of the fiducials 202 or 302 may be determined in two dimensions, such as within an image frame, or three dimensions such as a position in space. For example, the one or more cameras 124(1) may acquire one or more images of the PFOV 120.

At 1004, a predetermined pattern is projected onto at least a portion of the projection surfaces 112. For example, the predetermined pattern may comprise a grid, or pseudorandom noise pattern. In some implementations, the predetermined pattern may be provided by the structured light system 124(2).

At 1006, a displacement between the one or more fiducials 202 or 302 and at least a portion of the predetermined pattern is determined. At 1008, a projection correction based at least in part on the displacement is determined. The projection correction may comprise a series of vector quantities associated with one or more regions in projected images.

At 1010, one or more projected images are modified based at least in part on the projection correction. For example, the vector quantities may be applied to regions in the projected images, shifting pixels within those regions in a particular direction and distance. Now modified, the projected image from the image projector 118 is calibrated to provide output which is as desired.

Figure 11:
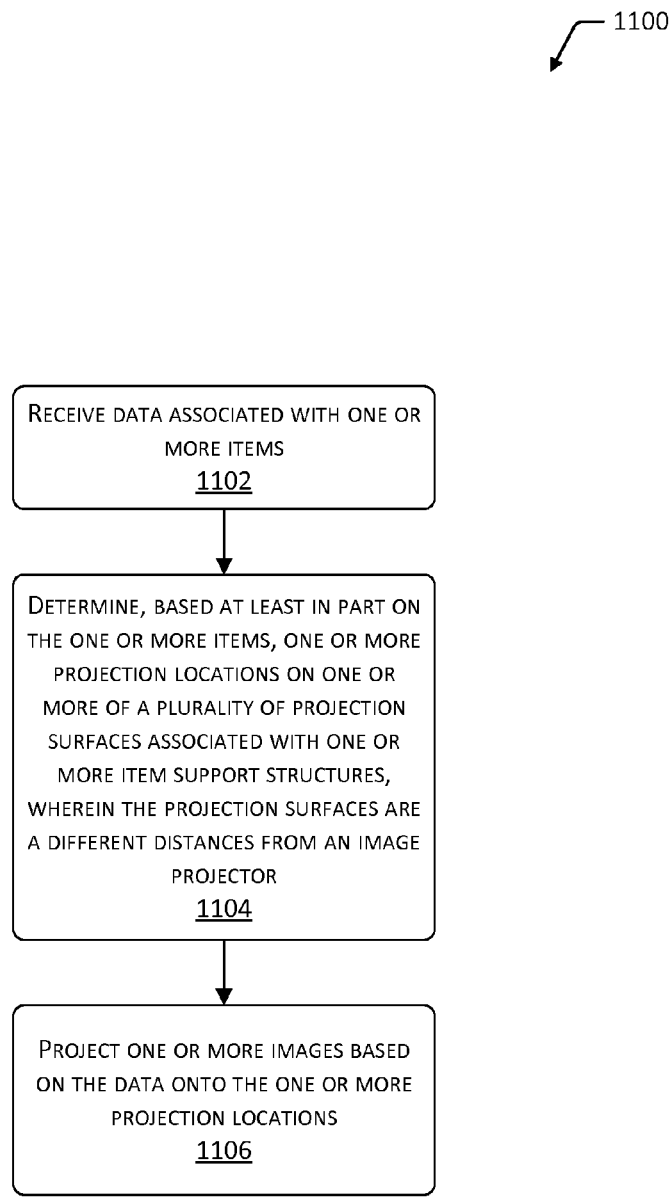
FIG. 11 is a flow diagram of a process of projecting a projected image comprising information about one or more items onto a plurality of projection surfaces.

FIG. 11 is a flow diagram 1100 of a process of projecting a projected image comprising information about one or more items 106 onto a plurality of projection surfaces 112. The process may be implemented by the presentation device 116.

At 1102, data associated with one or more items 106 is received. For example, the presentation device 116 may receive sales rank 214 information about the particular cologne item 106 from the external device 128.

At 1104, based at least in part on the one or more items, one or more projection locations on one or more of the plurality of projection surfaces 112. As described above, the projection surfaces 112 are associated with one or more item support structures 108. Each of these projection surfaces 112 may be at different distances from the image projector 118 and are within the same PFOV 120.

At 1106, one or more images based on the data are projected onto the one or more projection locations on the one or more projection surfaces 112. For example, the projected item tag 206 may be projected within the projection location which is bounded by a one-half inch border around the projection surface 112.

Figure 12:
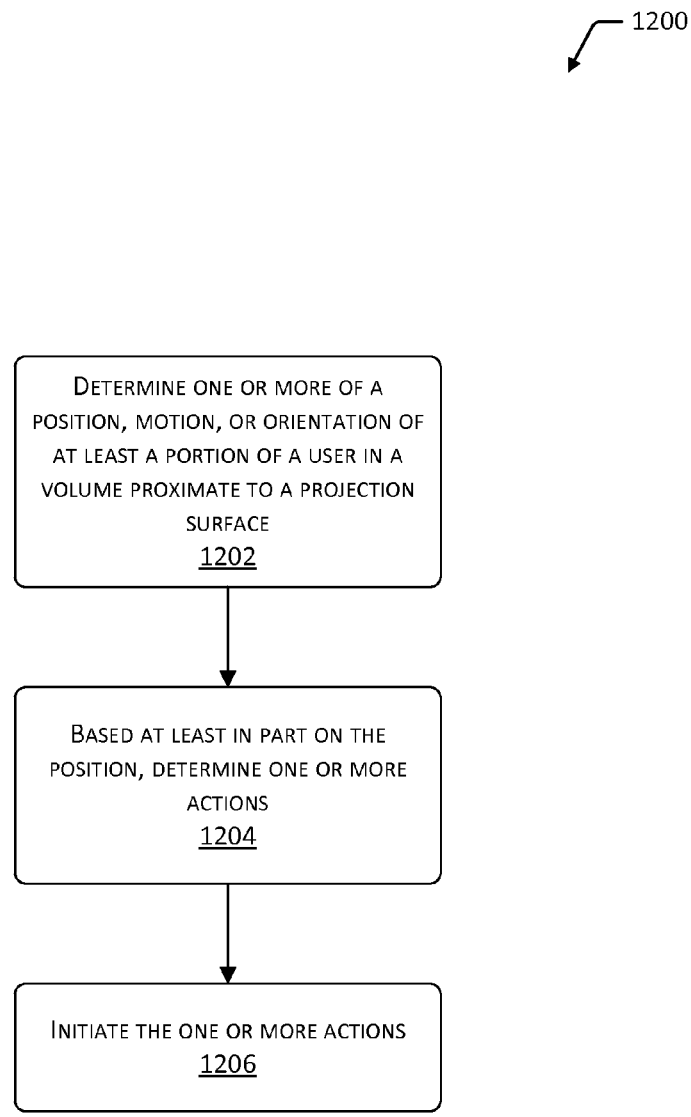
FIG. 12 is a flow diagram of a process of receiving input, such as a user response to the projected image, based on a position, motion, or orientation of the user in a volume proximate to the projection surface.

FIG. 12 is a flow diagram 1200 of a process of receiving input. This input may include a user response to the projected image. The user input may be determined based on a position, motion, or orientation of the user 102 in a volume proximate to one or more of the projection surfaces 112. This process may be implemented by one or more of the sensor module 716 and the virtual user interface module 718.

At 1202, one or more of a position, motion, or orientation of at least a portion of an object in a volume proximate to the projection surface 112 is determined. The object may be at least a portion of the user 102, such as a finger, hand, head, and so forth.

At 1204, based at least in part on the position, one or more actions are determined. For example, the user 102 pointing to a particular interaction control 220 may be associated with changing the presented language of the projected item tag 206 from English to French.

At 1206, the one or more actions are initiated. The one or more actions may include retrieving information associated with one or more items 106 and presenting onto the projection surface 112 one or more projected images based at least in part on the retrieved information. For example, the virtual user interface module 718 may retrieve the French version of the projected item tag 206 and present that version. Other actions may include buying the featured item 106 now, buying and shipping the featured item 106, finding similar items, requesting recommendations, and so forth.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a piece of furniture comprising:
a first support structure and a second support structure, each of the first and second support structures configured to hold one or more items, wherein the first support structure is at a different height relative to a floor than the second support structure;
a first projection surface structure associated with the first support structure and a second projection surface structure associated with the second support structure; and
one or more fiducials printed on the first projection surface structure and one or more fiducials printed on the second projection surface structure; and
a presentation device positioned, relative to the floor, at a height greater than the first support structure and the second support structure, the presentation device comprising:
one or more sensors configured to:
detect at least one or more of the one or more fiducials printed on the first projection surface structure or the one or more fiducials printed on the second projection surface structure; and
determine a position of at least a portion of one or more objects in three-dimensional space in a volume proximate to one or more of the first projection surface structure or the second projection surface structure; and
one or more image projectors, wherein:
each of the one or more image projectors has a projector field-of-view encompassing the first projection surface structure and the second projection surface structure; and
the each of the one or more image projectors is configured to project a projected image onto the first projection surface structure and the second projection surface structure within the projector field-of-view and the projection of the projected image is adjusted based at least in part on the at least one or more of the one or more fiducials printed on the first projection surface structure or the one or more fiducials printed on the second projection surface structure.

2. The system of claim 1, wherein:
the first support structure comprises a first shelf,
the second support structure comprises a second shelf,
the one or more items sitting upon one or more of the first shelf or the second shelf, and
the first projection surface structure is coupled to a first edge of the first shelf and the second projection surface structure is coupled to a second edge of the second shelf.

3. The system of claim 1, wherein the first projection surface structure is arranged at a first angle based at least in part on a first position relative to the one or more image projectors and the second projection surface structure is arranged at a second angle based at least in part on a second position relative to the one or more image projectors.

4. The system of claim 1, wherein the one or more sensors comprise a range camera configured to acquire image data and a distance to the one or more objects based at least in part on time-of-flight of one or more optical signals between the one or more objects and the range camera.

5. The system of claim 1, wherein the one or more objects comprise one or more fingertips, hands, or another portion of a user;
   wherein the projected image comprises a user interface, and the presentation device further comprising:
   one or more processors configured to:
      generate input based at least in part on the position of the at least a portion of the one or more objects that is determined; and
      change the projected image based at least in part on the input.

6. The system of claim 1, the presentation device further comprising:
   one or more communication interfaces configured to couple to one or more data networks; and
   one or more processors coupled to the one or more communication interfaces, the one or more processors configured to:
      receive information from the one or more data networks, and wherein the projected image projected within the projector field-of-view is based at least in part on the information.

7. A system comprising:
   a piece of furniture comprising:
      a first projection surface structure associated with a first item support structure, and
      a second projection surface structure associated with a second item support structure;
   an image projector configured to project a projected image within a projector field-of-view wherein the projector field-of-view simultaneously encompasses the first projection surface structure and the second projection surface structure of the piece of furniture; and
   one or more sensors configured to determine a position of at least a portion of one or more objects in three-dimensional space in a volume proximate to one or more of the first projection surface structure or the second projection surface structure of the piece of furniture.

8. The system of claim 7, wherein the first projection surface structure is positioned based at least in part on a first position of the first projection surface structure relative to the image projector and the second projection surface structure is positioned based at least in part on a second position of the second projection surface structure relative to the image projector, or wherein the image projector is positioned based at least in part on a corresponding position of the first projection surface structure and the second projection surface structure.

9. The system of claim 7, wherein distances between one or more of the first projection surface structure or the second projection surface structure and the image projector are between 3 and 16 feet, and the projector field-of-view is directed down relative to the image projector.

10. The system of claim 7, wherein the one or more objects comprise one or more users or portions thereof, and wherein the first item support structure and the second item support structure are configured to hold one or more items for sale.

11. The system of claim 10, the projected image comprising information associated with the one or more items for sale.

12. The system of claim 7, further comprising:
   one or more communication interfaces configured to couple to one or more data networks; and
   one or more processors coupled to the one or more communication interfaces, the one or more processors configured to:
      receive information from the one or more data networks, and wherein the projected image within the projector field-of-view is based at least in part on the information; and
      determine input based at least in part on the position of the at least a portion of the one or more objects that is determined.

13. The system of claim 7, wherein the first projection surface structure is positioned at a first distance from the image projector and the second projection surface structure is positioned at a second distance from the image projector, and further wherein the image projector comprises a tilt shift lens mechanism.

14. The system of claim 7, the one or more sensors comprising a camera, and the projected image comprises a structured light pattern.

15. The system of claim 7, the one or more sensors comprising an optical time-of-flight system including a light source, a light detector, and a timing mechanism configured to determine time-of-flight of a light signal emitted by the light source, reflected at least in part by the at least a portion of the one or more objects, and detected at the light detector.

16. A computer-implemented method comprising:
   determining, using one or more sensors, one or more of a position, motion, or orientation of at least a portion of a user proximate to an item support structure;
   based at least in part on the one or more of the position, motion, or orientation of the at least a portion of the user that is determined, retrieving information associated with one or more items supported by the item support structure; and
   presenting, onto a first projection surface associated with the item support structure and a second projection surface associated with the item support structure, one or more projected images based at least in part on the information that is retrieved.

17. The method of claim 16, wherein the one or more items are offered for sale and the item support structure comprises one or more of:
   a shelf,
   a bin,
   a basket,
   a drawer,
   a rack, or
   a pigeonhole.

18. The method of claim 16, the one or more projected images comprising information associated with the one or more items and indicative of one or more of:
   item name,
   pricing information,
   sales rank, or
   ratings.

19. The method of claim 16, further comprising:
   determining an identity of the user; and
   wherein the information associated with the one or more items is retrieved based at least in part on the identity of the user.

20. The method of claim 16, further comprising:
   determining positions of one or more fiducials associated with one or more of the first projection surface or the second projection surface;
   projecting a predetermined pattern onto at least a portion of the one or more of the first projection surface or the second projection surface;

determining a displacement between the one or more fiducials and at least a portion of the predetermined pattern;

determining a projection correction based at least in part on the displacement; and modifying at least one of the one or more projected images based at least in part on the projection correction.

21. A computer-implemented method comprising:

receiving first data from a data network;

projecting a projected image that is based on the first data within a projector field-of-view the projector field-of-view encompassing a first projection surface structure and a second projection surface structure associated with an item support structure, wherein one or more fiducials are printed on each of the first projection surface structure and the second projection surface structure;

determining second data, using one or more sensors, indicative of one or more of a position, motion, or orientation of at least a portion of a user proximate to the item support structure; and sending the second data using the data network.

* * * * *